United States Patent [19]

Thomas et al.

[11] Patent Number: 5,407,400
[45] Date of Patent: Apr. 18, 1995

[54] BRAKING SYSTEM

[75] Inventors: W. Roger Thomas, Cleveland; Melvin Temple, Co. Durham, both of United Kingdom

[73] Assignee: Black & Decker Inc., Newark, Del.

[21] Appl. No.: 30,943

[22] Filed: Mar. 12, 1993

[30] Foreign Application Priority Data

Mar. 14, 1992 [GB] United Kingdom ............... 9205611

[51] Int. Cl.$^6$ ..................... H02P 3/04; A01D 69/10
[52] U.S. Cl. ........................... 477/21; 477/23; 477/9; 56/11.3
[58] Field of Search ............... 192/1.36, 1.37, 1.38; 56/11.3, DIG. 4, DIG. 6; 477/21, 22, 23, 9, 199

[56] References Cited

U.S. PATENT DOCUMENTS

| | | |
|---|---|---|
| 3,731,472 | 5/1973 | Kamlukin ............................. 56/11.3 |
| 3,908,344 | 9/1975 | Zurek et al. ......................... 56/11.3 |
| 3,967,438 | 7/1976 | Tombers . |
| 4,037,389 | 7/1977 | Harkness ............................. 56/11.3 |
| 4,212,141 | 7/1980 | Miyazawa et al. ............... 56/11.3 X |
| 4,213,521 | 7/1980 | Modersohn ....................... 192/18 R |
| 4,306,405 | 12/1981 | Fleigle . |
| 4,351,424 | 9/1982 | Lawrence et al. ................ 192/18 R |
| 4,362,004 | 12/1982 | Rush, Jr. et al. ..................... 56/11.3 |
| 4,381,048 | 4/1983 | Haverkamp et al. ............. 192/1.37 X |
| 4,466,233 | 8/1984 | Thesman ............................. 56/11.3 |
| 4,470,490 | 9/1984 | Morel . |
| 4,730,710 | 3/1988 | Granitz .............................. 56/11.3 X |
| 5,033,595 | 7/1991 | Pardee . |

FOREIGN PATENT DOCUMENTS

| | | |
|---|---|---|
| 0208465 | 1/1987 | European Pat. Off. . |
| 0209271 | 1/1987 | European Pat. Off. . |
| 0288348 | 10/1988 | European Pat. Off. . |
| 2411503 | 7/1979 | France . |
| 878538 | 3/1960 | United Kingdom . |
| 1461485 | 4/1974 | United Kingdom . |
| 1540312 | 8/1976 | United Kingdom . |

Primary Examiner—Andrea L. Pitts
Attorney, Agent, or Firm—Charles E. Yocum; Dennis A. Dearing; John D. Del Ponti

[57] ABSTRACT

A braking system for a powered rotary tool of the type in which a shaft is rotated about an axis by a motor includes a first brake element mounted for rotation with the shaft; a second brake element which is restrained from rotation; a biasing member normally urging the first brake element in an axial direction into braking contact with the second brake element and a brake release subsystem, the brake release subsystem to release the braking contact between the first and second brake elements upon start-up of the motor. On start-up of the motor, the shaft is free to rotate through a small angle of rotation before initiating rotation of the first brake element. The release subsystem includes at lease one pair of co-operating ramp surfaces, one of the ramp surfaces being arranged for rotation with the shaft and the other of the ramp surfaces being arranged for rotation with the first brake element. The braking system of the present invention is particularly suitable for use on a rotary-blade lawn mower.

38 Claims, 4 Drawing Sheets

BRAKING SYSTEM

BACKGROUND OF THE INVENTION

The present invention relates to an improved braking system which is particularly suitable for use with a powered rotary tool of the type in which a shaft is rotated about an axis by a motor, for example a lawn mower of the rotary type in which a blade and optionally an impeller are rotated about a common axis by a motor, which may be an electric motor or a petrol motor.

For safety reasons, it is necessary to incorporate a braking system within the lawn mower, so that the blade and, where provided, the impeller are brought to a stop within a specified time. With the increased concern for safety, safety requirements are continually becoming more stringent, and it is now generally accepted that a stop time of less than 3 seconds is particularly desirable, and indeed is increasingly being required by statutory regulations in many countries.

Braking systems which are currently available for use on mowers of this type include electromechanical systems which are spring loaded brake systems comprising a brake pad and a brake disc, the spring urging the pad and disc into braking contact and being opposed by the action of a solenoid.

For mowers of the type driven by induction motor brakes of the type in which the magnetic field created in the rotor is used to hold a movable brake disc in an OFF position against the spring force while the motor is running have been proposed. In these systems, the magnetic field is energised only when the motor is energised.

Braking systems for electric motors are also known, which comprise an electromagnetically releasable spring actuated brake with a braking surface, a brake disc driven in rotation, a release device non-rotatably secured to the braking surface, and an armature mounted non-rotatably and so as to be capable of axial displacement between the brake disc and the release device, and biased by springs against the brake disc. Such braking systems have been disclosed in connection with motors having substantially horizontally mounted axles to be stopped.

In such braking systems, on energising the motor the axle moves to separate the brake disc from its corresponding braking surface. On de-activating the motor, the spring urges the brake disc back into contact with the braking surface.

It is a disadvantage of the known electromechanical braking systems that they are expensive to manufacture and add significantly to the cost of each unit to which they are fitted. Where attempts have been made to reduce the cost of these systems by using part of the motor housing to provide part of the housing for the solenoid coil and spring, these systems only achieve a stop time in the order of 5 seconds, which is not sufficiently short to satisfy the more stringent safety requirements which require a stop time of less than 3 seconds.

Known electromagnetically releasable spring actuated braking systems would not be suitable for use with a substantially vertical shaft, since the force generated by the magnetic field is not sufficient to hold the armature in its raised position under normal running conditions, after the initial surge observed when the motor is energised.

It is an object of the present invention to provide a braking system suitable for a powered rotary tool, in which the above disadvantages are reduced or substantially obviated.

BRIEF SUMMARY OF THE INVENTION

The present invention provides a braking system suitable for use with a powered rotary of the type in which a shaft is rotated about an axis by a motor, which system comprises (i) a first brake element mounted for rotation with the shaft;

(ii) a second brake element which is restrained from rotation;

(iii) resilient means urging the first brake element in an axial direction into braking contact with the second brake element and (iv) a brake release subsystem, or means to release the braking contact between the first brake element and the second brake element on start-up of the motor, characterised in that on start-up of the motor the shaft is free to rotate through a small angle of rotation before rotation of the first brake element is initiated, and the means for releasing the braking contact on start-up of the motor comprises at least one pair of co-operating ramp surfaces, one of each pair of ramp surfaces being arranged for rotation with the shaft, and the co-operating ramp surface being arranged for rotation with the first brake element.

The means for releasing the braking contact on start-up of the motor preferably comprises four equiangularly spaced pairs of co-operating ramp surfaces.

The braking system according to the present invention is particularly suitable for use with a lawn mower of the rotary type in which a blade and an impeller are rotated about an axis by a motor.

In a lawn mower of this type, each ramp surface arranged for rotation with the shaft is preferably located on an adaptor which is mounted for rotation with the shaft, and the co-operating ramp surface is preferably located on a drive insert which is mounted for rotation with the blade or impeller.

BRIEF DESCRIPTION OF THE DRAWINGS

The invention will now be further described with reference to the accompanying drawings, of which

DETAILED DESCRIPTION OF THE PREFERRED EMBODIMENTS

Figure 1:
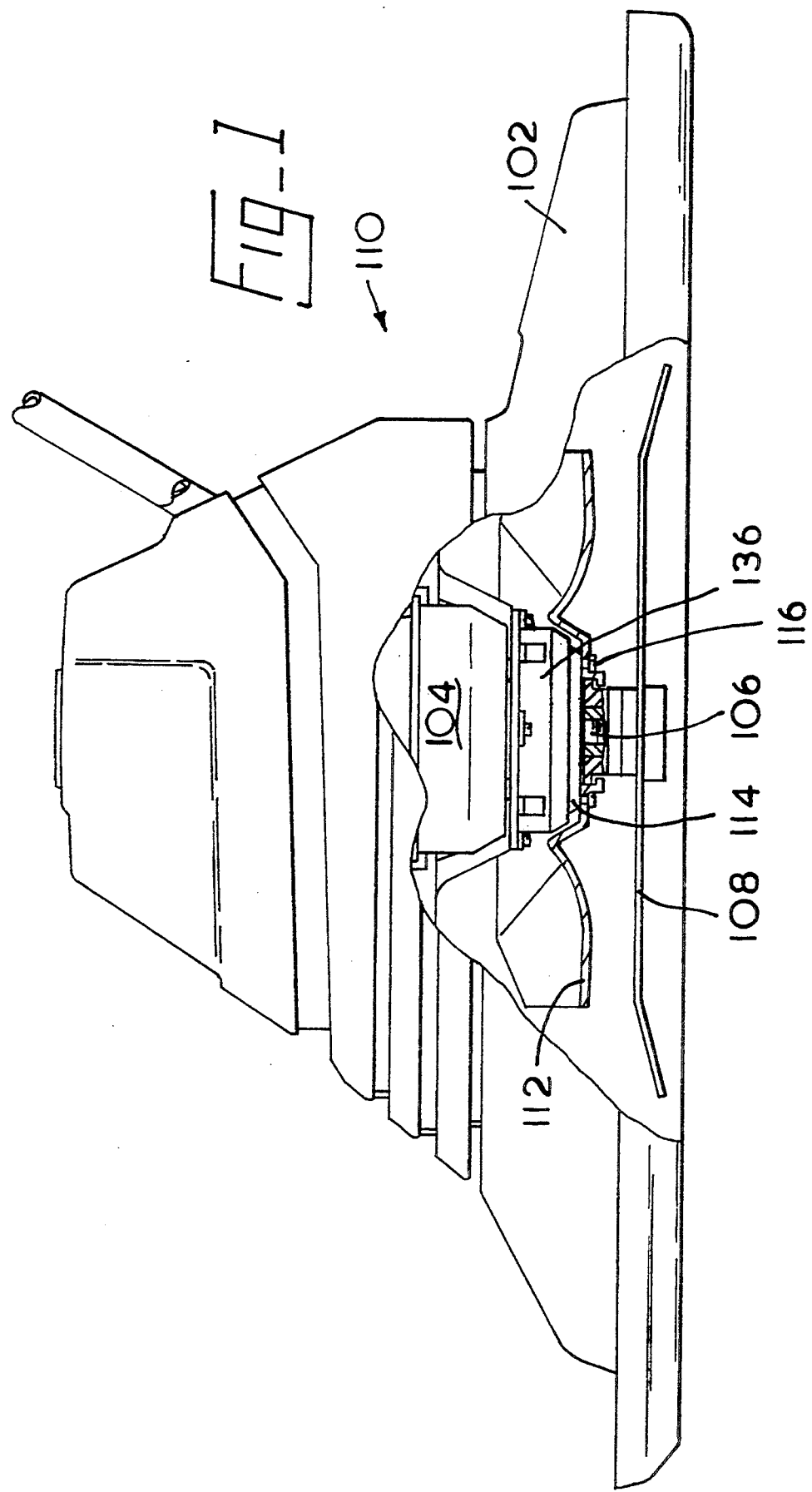
FIG. 1 is a general side elevation, partially in section, of a lawn mower comprising an embodiment of a braking system according to the invention.

As shown in FIG. 1, a rotary lawn mower 110 incorporating one embodiment of the present invention comprises a deck 102 on which a series electric motor 104 is mounted. The motor 104 is provided with an output shaft 106 on which is fitted a blade 108 and impeller 112. A brake disc 114 is attached by means of screws 116 to the impeller 112. With respect now to FIGS. 2 and 3, adaptor 118 is securely fixed to the output shaft 106 via cooperating flats 117, 107, and an assembly comprising the impeller 112 and disc 114, together with a drive insert 120 is slidably mounted on the output shaft 106, by means of the adaptor 118, so that the assembly is free to move in an axial direction relative to the shaft 106.

Figure 2:
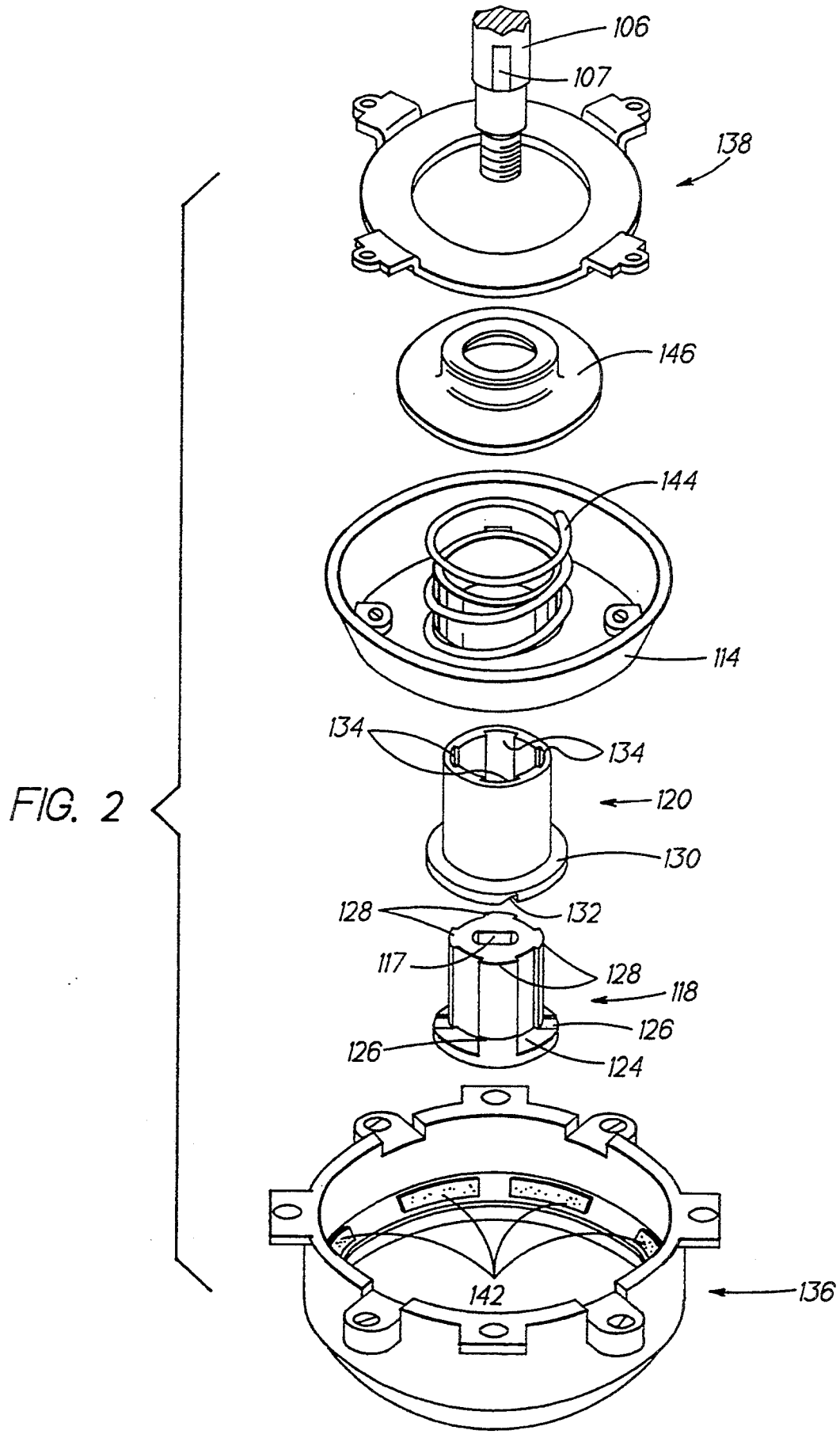
FIG. 2 is an exploded view on an enlarged scale, of the braking system of FIG. 1.

As can be seen from FIG. 2, the adaptor 118 is generally cylindrical in shape, with an annular flange 124 formed at the end remote from the output shaft 106. Four equiangularly spaced ramps 126 project axially from the upper surface of the annular flange 124, the height of the ramps increasing in the direction of rotation of the shaft 106. Associated with each of the ramps 126, a spline 128 projects radially from a cylindrical wall of the adaptor 118, extending axially from the ramp 126 to the end of the adaptor remote from the flange 124.

As can also be seen from FIG. 2, the drive insert 120 is also generally cylindrical in shape and is similarly provided with an annular flange 130 at the end remote from the output shaft 106. Four equiangularly spaced drive ramp surfaces 132 are formed as recesses in the lower surface of the annular flange 130, the depth of the recesses increasing in the direction of rotation of the shaft 106. Associated with each of the drive ramp surfaces 132, a groove 134 is formed in the internal wall of the drive insert 120 and extends from the ramp surface 132 axially for the full length of the drive insert.

The internal diameter of the drive insert 120 and the external diameter of the adaptor 118 are selected so that the adaptor 118 is received within the insert 120 as a sliding fit. The width of the grooves 134 in the insert 120 is greater than the width of the splines 128 in the adaptor 118, so that a limited amount of angular rotation of the adaptor 118 with respect to the insert 120 is possible.

A brake friction housing 136 is secured to a mounting plate 138 which is itself secured to a housing 140 of the motor 104. Brake friction pads 142 are attached to an inner surface of the brake friction housing 136.

A spring 144 is provided to normally urge the brake disc 114 downwardly into braking contact with the pads 142 on the brake friction housing 136.

A cup washer 146 is mounted on the shaft 106 and clamped against the bearing of the housing 140 by the adaptor 118. The cup washer 146 rotates with the shaft, and has the function of compressing the spring 144 against the brake disc 114.

In operation, as the motor 104 is energised, the adaptor 118 is driven by the output shaft 106 and begins to rotate. As the adaptor 118 begins to rotate, its ramp surfaces 126 engage with the drive ramp surfaces 132, its the drive insert 120 is thereby pushed axially upwards against the action of the spring 144. The drive insert 120 in turn lifts the brake disc 114 away from braking contact with the brake pads 124 on the brake friction housing 120.

After the initial rotation of the motor output shaft 106, the splines 128 engage with the corresponding side walls of the grooves 134 and the drive insert 120, and hence the impeller 112 begins its delayed rotation.

As the speed of rotation increases, a pressure differential is built up due to the rotation of the impeller 112, and the pressure on the motor side of the impeller 112 falls sharply, tending to draw the assembly comprising the rotating 112 and brake disc 114 towards the motor 104 against the action of the spring 144. (Keeping in mind that the impeller 112 and blade 108 are free to rotate.)

When the motor 104 is switched off, the impeller 112 is no longer driven by the output shaft 106 and the speed of rotation reduces sharply. This has the effect of reducing the pressure differential between the two surfaces of the impeller, equalising the rotational forces on the impeller. The force of the spring 144 is no longer opposed by the suction force generated by the rotating impeller 112 and thus urges the brake disc 114 and brake friction plate 136 into braking contact, thus braking the system.

Figure 3:
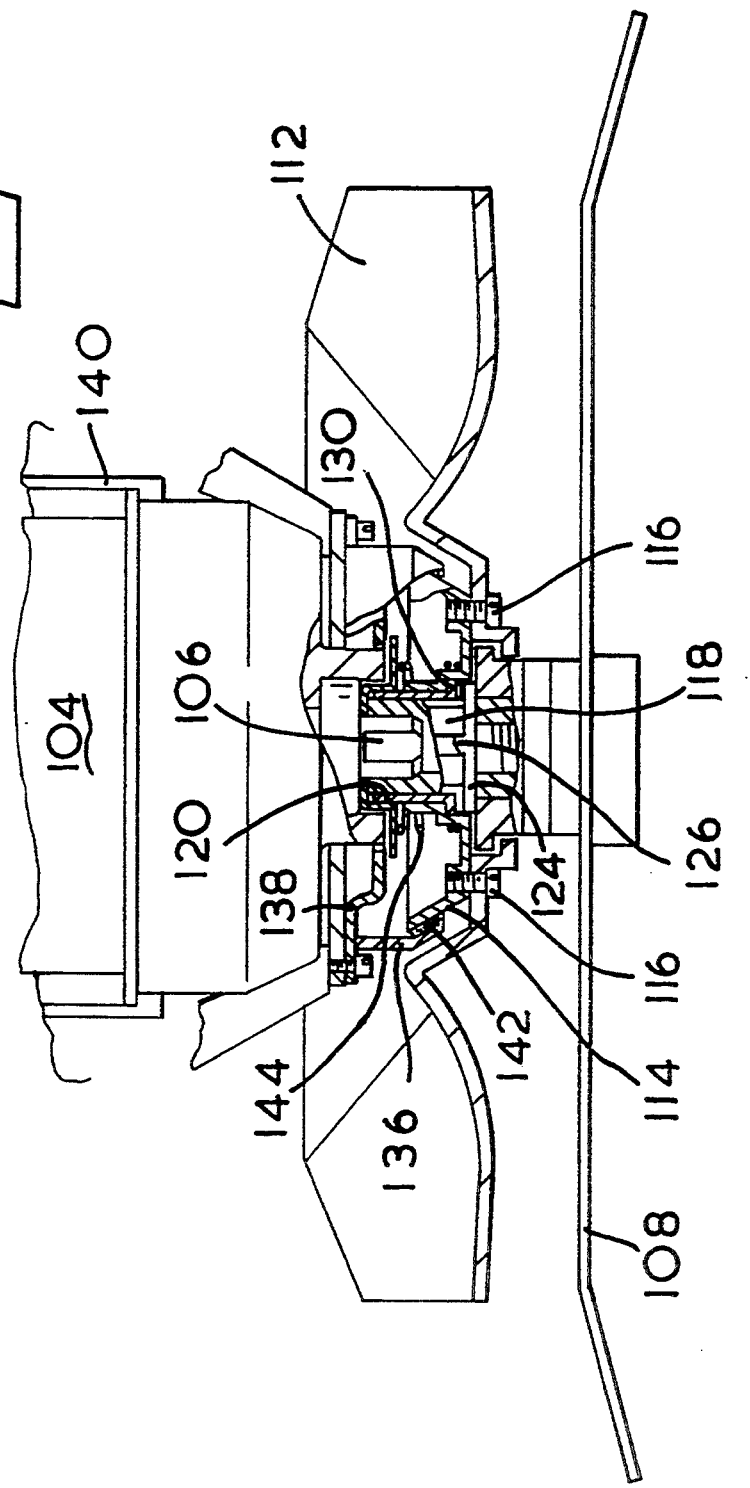
FIG. 3 is a side elevation, partially in section, of the braking system of FIGS. 1 and 2.
Figure 4:
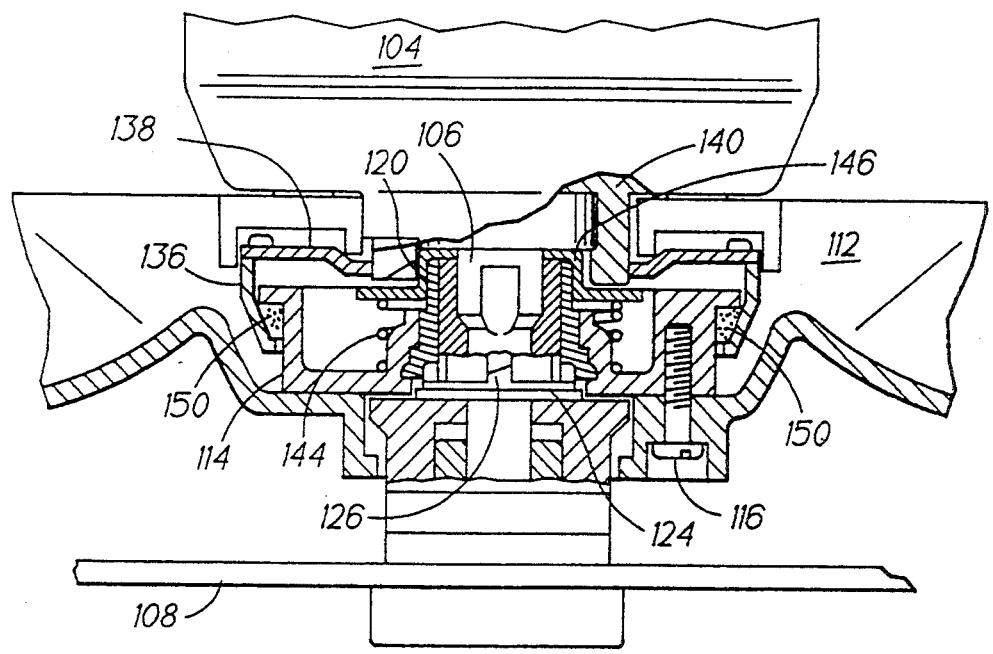
FIG. 4 is a side elevation, partially in section, of an alternative embodiment of a braking system according to the invention in the braked position.
Figure 5:
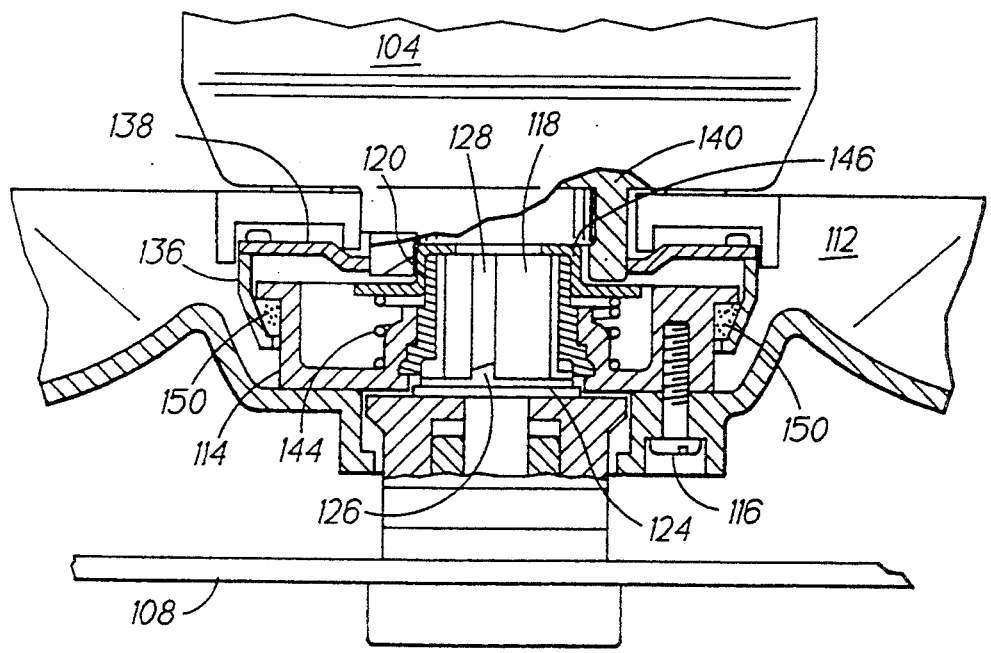
FIG. 5 is a similar view to FIG. 4, in the non-braked position.

An alternative embodiment of a braking system according to the present invention is shown in FIGS. 4 and 5. The braking system shown in FIGS. 4 and 5 is similar in many respects to that of FIGS. 1 to 3, but differs therefrom in the design and detailed operation of the first and second brake elements.

As is shown in FIG. 4, a brake housing 136 is secured to a mounting plate 138 which is itself secured to a housing 140 of the motor 104. A spring 144 is provided to urge a brake disc 114 downwardly into braking contact with the brake housing 136. A ring shaped friction element 150 is attached to the brake disc 114 by a suitable method of attachment, such as by interference fit, bonding or screw thread, and rotates therewith.

In FIG. 4, the braking system is shown in the engaged position. The spring 144 is urging the brake disc 114, with attached friction element 150, into braking contact with the brake housing 136.

The operation of the braking system is as described above in connection with the embodiment shown in FIGS. 1 to 3. As the motor 104 is energised, the adaptor 118 is driven by the output shaft 106 and begins to rotate. As the adaptor 118 begins to rotate, the ramp surfaces 126 engage with the ramp surfaces 132, and the drive insert 120 is pushed axially upwards against the action of the spring 144. The drive insert 120 lifts the brake disc 114, with friction element 150, away from braking contact with the brake housing 136.

In yet another alternative embodiment of a braking system according to the present invention, the brake housing 136 or, preferably the disc 114, may comprise a moulded thermoset plastics part, in particular moulded from a thermoset plastics material which is based on a phenolic resin, and is filled with a suitable filler, for example glass fibres, in order to improve its strength.

Where the disc is moulded from a thermoset plastics material, and the housing is in metal, the disc can then act as heat insulator to reduce the transfer of heat from the brake contact area to the plastic impeller.

Accordingly, it will be apparent to those skilled in the art that various modifications and variations can be made in the braking system of the present invention without departing from the scope or spirit of the invention. Thus, it is intended that the present invention cover the modifications and variations of this invention provided they come within the scope of the appended claims and their equivalents.

What is claimed is:

1. A braking system for a powered rotary tool in which a shaft is rotated about an axis by a motor, comprising:
   (i) a first brake element mounted for rotation with said shaft;
   (ii) a second brake element which is restrained from rotation;

(iii) resilient means urging said first brake element in an axial direction into braking contact with said second brake element; and (iv) means for releasing the braking contact between said first brake element and said second brake element upon start-up of said motor, wherein upon start-up of said motor, said shaft is free to rotate through a small angle of rotation before rotation of said first brake element is initiated, and said means for releasing the braking contact upon start-up of said motor includes at least one pair of cooperating ramp surfaces, one surface of each said pair of said cooperating ramp surfaces being arranged for rotation with said shaft and the other surface of each said pair of said cooperating ramp surfaces being arranged for rotation with said first brake element.

2. A braking system according to claim 1, wherein said first brake element further comprises a first friction element.

3. A braking system according to claim 2, wherein said second brake element further comprises a second friction element.

4. A braking system according to claim 1, wherein said means for releasing the braking contact on start-up of said motor comprises four equiangularly spaced pairs of cooperating ramp surfaces.

5. A braking system according to claim 1, wherein said one surface of each said pair of said cooperating ramp surfaces is located on an adaptor which is mounted for rotation with said shaft, and the other surface of said each pair of said cooperating ramp surfaces is located on a drive insert which is mounted for rotation with one of a blade driven by said motor and an impeller driven by said motor.

6. A braking system according to claim 2, wherein said first friction element includes a ring which is attached to a brake disc by means of one of a group of attachment means consisting of an interference fit, a screw thread, and bonding.

7. A braking system according to claim 2 wherein said first friction element includes a moulded thermoset plastic disc.

8. A braking system according to claim 3, wherein said second friction element includes a moulded thermoset plastic brake housing.

9. A braking system according to claim 7, wherein said disc comprises a filled phenolic resin part.

10. A braking system according to claim 9, wherein said phenolic resin is filled with glass fibre.

11. A braking system according to claim 8, wherein said brake housing comprises a filled phenolic resin part.

12. A braking system according to claim 11, wherein said phenolic resin is filled with glass fibre.

13. A braking system for a rotary lawn mower in which a blade and an impeller are rotated about an axis by a shaft drivingly connected to a motor, comprising:

(i) a first brake element mounted for rotation with said impeller;

(ii) a second brake element which is restrained from rotation;

(iii) resilient means urging said first brake element in an axial direction into braking contact with said second brake element; and (iv) means for lifting said impeller upon start-up of said motor, in order to release the braking contact between said first brake element and said second brake element, wherein, upon start-up of said motor, said shaft is free to rotate through a small angle of rotation before rotation of said impeller is initiated, and said means for lifting said impeller upon start-up of said motor includes at least one pair of cooperating ramp surfaces, one surface of each said pair of cooperating ramp surfaces being arranged for rotation with said shaft and the other surface of each said pair of cooperating ramp surfaces being arranged for rotation with said impeller.

14. A braking system according to claim 13, wherein said first brake element further comprises a first friction element.

15. A braking system according to claim 14, wherein said second brake element further comprises a second friction element.

16. A braking system according to claim 13, wherein said means for releasing the braking contact on start-up of said motor comprises four equiangularly spaced pairs of cooperating ramp surfaces.

17. A braking system according to claim 13, wherein one surface of said each pair of cooperating ramp surfaces is located on an adaptor which is mounted for rotation with said shaft, and the other surface of said each pair of cooperating ramp surfaces is located on a drive insert which is mounted for rotation with one of said blade and said impeller.

18. A braking system according to claim 13, wherein said first friction element includes a ring which is attached to a brake disc by means of one of the group of attachment means consisting of an interference fit, a screw thread, and bonding.

19. A braking system according to claim 14, wherein said first friction element includes a moulded thermoset plastic disc.

20. A braking system according to claim 15, wherein said second friction element includes a moulded thermoset plastic brake housing.

21. A braking system according to claim 19, wherein said disc comprises a filled phenolic resin part.

22. A braking system according to claim 21, wherein said phenolic resin is filled with glass fibre.

23. A braking system according to claim 20, wherein said brake housing comprises a filled phenolic resin part.

24. A braking system according to claim 23, wherein said phenolic resin is filled with glass fibre.

25. A braking system for a powered rotary tool in which a shaft is rotated about an axis by a motor, comprising:

(i) a first brake element mounted for rotation with said shaft;

(ii) a second brake element which is restrained from rotation;

(iii) resilient means for urging said first brake element in an axial direction into braking contact with said second brake element; and (iv) means for releasing the braking contact between said first brake element and said second brake element upon start-up of said motor, wherein upon start-up of said motor, said shaft is free to rotate through a small angle of rotation before rotation of said first brake element is initiated, and said means for releasing the braking contact upon start-up of said motor includes at least one pair of cooperating ramp surfaces, and wherein one surface of each said pair of cooperating ramp surfaces is located on an adaptor which is mounted for rotation with said shaft, and the other surface of each said pair of cooperating ramp surfaces is located on a drive insert which is mounted for rotation with said first brake element.

26. A braking system for a powered rotary tool in which a shaft is rotated about an axis by a motor comprising:
 (i) a first brake element mounted for rotation with said shaft;
 (ii) said shaft being free to rotate through a small angle of rotation before rotation of said first brake element is initiated;
 (iii) a second brake element which is restrained from rotation;
 (iv) a resilient member normally urging said first brake element in an axial direction into braking contact with said second brake element; and
 (v) a brake release subsystem for releasing the braking contact between said first and second brake elements upon start-up of said motor; wherein
 (vi) the brake release subsystem including at least one pair of cooperating ramp surfaces, one surface of each said pair of cooperating ramp surfaces being arranged for rotation with said shaft and the other surface of each said pair of cooperating ramp surfaces being arranged for rotation with said first brake element.

27. A braking system according to claim 26, wherein said first brake element further comprises a first friction element.

28. A braking system according to claim 27, wherein said second brake element further comprises a second friction element.

29. A braking system according to claim 26, wherein said brake release subsystem comprises four equiangularly spaced pairs of cooperating ramp surfaces.

30. A braking system according to claim 26, wherein said one surface of each said pair of cooperating ramp surfaces is located on an adaptor which is mounted for rotation with said shaft, and said other surface of each said pair of cooperating ramp surfaces is located on a drive insert which is mounted for rotation with one of a blade driven by said motor and an impeller driven by said motor.

31. A braking system according to claim 27, wherein said first friction element includes a ring which is attached to a brake disc by means of one of the group of attachment subsystems consisting of an interference fit, screw thread, and bonding.

32. A braking system according to claim 27, wherein said first friction element includes a moulded thermoset plastic disc.

33. A braking system according to claim 28, wherein said second friction element includes a moulded thermoset plastic brake housing.

34. A braking system according to claim 32, wherein said disc comprises a filled phenolic resin part.

35. A braking system according to claim 34, wherein said phenolic resin is filled with glass fibre.

36. A braking system according to claim 33, wherein said brake housing comprises a filled phenolic resin part.

37. A braking system according to claim 36, wherein said phenolic resin is filled with glass fibre.

38. A braking system for a rotary lawn mower in which a blade and an impeller are rotated about an axis by a shaft directly connected to a motor, comprising:
 (i) a first brake element mounted for rotation with said impeller;
 (ii) a second brake element which is restrained from rotation;
 (iii) a resilient member normally urging said first brake element in an axial direction into braking contact with said second brake element; and
 (iv) a brake release subsystem for lifting said impeller upon start-up of said motor, in order to release the braking contact between said first brake element and said second brake element,
 wherein, upon start-up of said motor, said shaft is free to rotate through a small angle of rotation before rotation of said impeller is initiated, and wherein said brake release subsystem includes at least one pair of cooperating ramp surfaces, one surface of each said pair of cooperating ramp surfaces being arranged for rotation with said shaft and the other surface of each said pair of cooperating ramp surfaces being arranged for rotation with said impeller.

* * * * *